United States Patent [19]
Kagiya et al.

[11] 3,816,284
[45] June 11, 1974

[54] RADIATION GRAFTING OF VINYL MONOMERS ONTO CELLULAR POLYMERIC SUBSTRATES

[75] Inventors: Tsutomu Kagiya, Kyoto; Hiroshi Mitsui, Takasaki; Fumio Hosoi, Takasaki; Takahiko Fujimoto, Takasaki; Hiroshi Takata, Takasaki; Kazuyoshi Tsuneta, Takasaki; Masahiro Ushirokawa, Takasaki, all of Japan

[73] Assignee: Japan Atomic Energy Research Institute, Tokyo, Japan

[22] Filed: Aug. 20, 1971

[21] Appl. No.: 173,695

[30] Foreign Application Priority Data
Aug. 22, 1970 Japan.............................. 45-73592

[52] U.S. Cl... 204/159.17, 204/159.15, 204/159.16, 260/2.5 H, 260/2.5 HA, 260/2.5 HB, 260/2.5 P, 260/874, 260/875, 260/878, 260/879, 260/881, 260/884, 260/885, 260/886
[51] Int. Cl......... B01j 1/10, B01j 1/12, C08f 15/00
[58] Field of Search........ 204/159.17; 260/878, 879

[56] References Cited
UNITED STATES PATENTS
3,334,080   8/1967   Blanchard.......................... 260/878

*Primary Examiner*—Murray Tillman
*Assistant Examiner*—Richard B. Turer
*Attorney, Agent, or Firm*—Toren and McGeady

[57] ABSTRACT

The heat resistance of cellular plastics is remarkably improved when they are subjected to irradiation by ionizing radiation in the presence of a mixture of a cross-linking agent comprising an acetylenic compound having an ethynyl radical and/or an allene compound having a 1,2 diene structure, and a vinyl monomer.

1 Claim, No Drawings

RADIATION GRAFTING OF VINYL MONOMERS ONTO CELLULAR POLYMERIC SUBSTRATES

BACKGROUND OF THE INVENTION

This invention relates to a method of improving the heat resistance of cellular plastics which comprises subjecting them to irradiation by ionizing radiation.

By virtue of their properties, such as thermal insulating and cushioning, cellular plastics are being widely used for cushioning materials, packings, packaging materials, transportation and marine structural parts, building materials, civil engineering applications, thermal insulators for high or low temperature use, agricultural applications, floats, electrical applications, sporting goods, sundry goods, and the like. Nevertheless, since cellular plastics in general are poor in heat resistance varying in degree with the kind of plastic used for the basic material, they have the disadvantage that they cannot be used for applications in which heat resistance is required. As a consequence, it poses an important problem in industry to seek to improve their heat resistance.

In this connection, among the known methods of improving the heat resistance of cellular plastics is the one which involves foaming after improving the heat resistance of the basic plastic material beforehand. This, however, presents a drawback in that difficulties arise in foaming of the treated material. Further, for this purpose, a method is known which is designed to improve the heat resistance of cellular plastics by simply cross-linking the basic plastic material by means of irradiation with ionizing radiation of a cellular plastic prepared by a conventional method. However, this method entails irradiation at large dosages of ionizing radiation, and consequently causes cleavages in the polymer chains of the basic plastics material, reducing the mechanical strength of the cellular plastic.

STATEMENT OF THE INVENTION

It is an object of the present invention to provide a method for improving the heat resistance of cellular plastics prepared by the conventional methods to overcome shortcomings involved in the improvement of the heat resistance of cellular plastics irradiation. This object may be achieved by subjecting the cellular plastic to irradiation by ionizing radiation in the presence of a cross-linking agent, a vinyl monomer or a mixture thereof.

We have discovered, in the course of our research in the radiation cross-linking of plastics, that cross-linking reactions continuously progress when the plastics are subjected to irradiation by ionizing radiation in the presence of an acetylenic compound or an allene compound. Furthermore, we have found that in the radiation polymerization of vinyl monomers, when the monomers of vinyl polymers coming under the category of cross-linkable high polymers are irradiated with ionizing radiation, the monomers are polymerized and then the polymers formed are cross-linked. This cross-linking polymerization is accelerated by the presence of the acetylenic compounds or allene compounds mentioned above. Further results obtained reveal that cross-linking takes place when the monomers of vinyl polymers belonging to the category of degrading type high polymers are irradiated with ionizing radiation in the presence of the acetylenic or allene compound mentioned above.

The present invention has been achieved by ascertaining that the heat resistance of cellular plastics is improved when, on the basis of the results obtained as described hereinabove, the cellular plastics have been irradiated with ionizing radiation in the presence of an acetylenic compound and/or an allene compound and a vinyl monomer of cross-linking type or degrading type high polymer, or a mixture thereof.

The cellular plastics which can be processed in accordance with the method of this invention are such plastics as possess open cells and/or closed cells internally formed by foaming by means of beads expansion, extrusion molding, or any other suitable method of foaming. The plastic materials used therein are exemplified by polyethylene, ethylene-vinyl acetate copolymer, polypropylene, polyvinyl chloride, polystyrene, ABS resins, polyvinyl alcohol, and acrylic resins.

On the other hand, the cross-linking agents used in the method of this invention include acetylenic compounds having in each molecule at least one ethynyl radical represented by the general formula CH ≡ C—, allene compounds having in each molecule at one 1,2-diene structure represented by the general formula

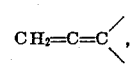

and compounds having in each molecule both an ethynyl radical and a 1,2-diene structure simultaneously and also the mixtures of two or more arbitrarily selected from the foregoing compounds. They are, for example, acetylene, methyl acetylene, ethyl acetylene, 1-pentyne, 3-methyl-1-butyne, 1-hexyne, 3,3-dimethyl-1-butyne, 1-octyne, 1-octadecyne, propionic acid, propiolaldehyde, propargyl alcohol, 3-methyl-1-butyne-3ol, vinyl acetylene, 1,2-propadiene, and 1,2-butadiene.

Further, the vinyl monomers mentioned in this invention are polymerizable compounds having in each molecule at least one carbon-to-carbon double bond, examples of which include olefins, dienes, vinyl acetylene and derivatives thereof, halogenated vinyl monomers, styrene and derivatives thereof, vinyl derivatives including aromatic ring or heterocyclic compounds, acrylic acid and acrylic esters, methacrylic acid and methacrylates, derivatives of unsaturated dibasic acids, vinyl esters, allylalcohol and allyl esters, vinyl ethers, vinyl carbonyl compounds, N-vinyl derivatives, sulfur containing monomers, and mixtures thereof. Further, of these vinyl monomers, the monomers of vinyl polymers coming under the cross-linkable type high polymers are the monomers of those vinyl polymers which are cross-linked when the polymers, such as those of ethylene, propylene, styrene, acrylic acid and esters thereof, acrylamide, acrylonitrile, vinyl chloride, vinyl acetate, acrolein and the like, are irradiated with ionizing radiation. The monomers of vinyl polymers classified under degrading type high polymers are the monomers of those vinyl polymers which degrade when the polymers, such as those of isobutylene, α-methyl styrene, methacrylic acid and esters thereof, methacrylamide, methacrylonitrile, vinylidene chloride, tetrafluoroethylene, trifluorochloroethylene and the like, are irradiated with ionizing radiation.

The afore-mentioned cross-linking agents, vinyl monomers or their mixtures, which are added to cellular plastics in accordance with the method of this invention may be in gaseous, liquid or solid phase or may be their mixtures with other substances in gaseous or liquid phase. Further, there is no need to lay down any rules as regards the method of adding the cross-linking agents, vinyl monomers or their mixtures to cellular plastics, the amounts to be added, and the proportions of the cross-linking agent and the vinyl monomer when a mixture of the two is used, but they may be determined depending on the type of the cellular plastic involved, the type of the cross-linking agent, of the vinyl monomer or of their mixture used, the temperature, the pressure, the conditions of irradiation, such as the type of radiation used, the degree of heat resistance desired, and so forth.

In the procedure of the method of this invention, the cross-linking agent, the vinyl monomer or their mixture may be added, by mixing, impregnation or any other suitable method, during the process of manufacturing the cellular plastic or after they are manufactured, and the irradiation by ionizing radiation may subsequently be carried out. Alternatively, the cellular plastic may be subjected to irradiation by ionizing radiation in the atmosphere of a cross-linking agent, a vinyl monomer or a mixture of the two, in gaseous phase or the irradiation by ionizing radiation may be conducted after the cellular plastics have been impregnated by immersion in a cross-linking agent, a vinyl monomer or a mixture of the two in liquid phase or in a solution of a suitable solvent in which a cross-linking agent, a vinyl monomer or a mixture of the two, in solid phase is dissolved. Further, the same objective can be achieved by adding a cross-linking agent, a vinyl monomer or a mixture of the two to cellular plastics irradiated beforehand with ionizing radiation.

Although it is desirable to determine by experiment, as described hereinbefore, the amount of the cross-linking agent, of the vinyl monomer or of their mixture, which is added to the cellular plastics in accordance with the method of this invention, extremely small additions of the order of 1 p.p.m. can improve the heat resistance of the cellular plastics, and in general, additions of 10 p.p.m. to 50 percent by weight are used. Further, analogously, since desired results can adequately be effected by using a vinyl monomer containing a very small amount of a cross-linking agent or a cross-linking agent containing a very small amount of a vinyl monomer, there is no need particularly to fix the blending proportions when a mixture of a cross-linking agent and a vinyl monomer is used. Nevertheless, in general, it is desirable to keep the concentration of a cross-linking agent in a mixture of the chain cross-linking agent and a vinyl monomer at $10^{-5} - 99$ mole percent, preferably $10^{-4} - 90$ mole percent.

In the procedure of this invention, ionizing radiation from any source can be used. More particularly, radioactive rays, such as an electron beam, neutron rays, $\alpha$-rays, $\beta$-rays, $\gamma$-rays, X-rays, ultraviolet rays, proton rays, and deuteron rays may be given as examples. Further, the dose of radiation required in performing the method of this invention is in the range of $10^2 - 10^9$ roentgens, particularly $10^3 - 10^8$ roentgens. It is, however, desirable to determine the dosage by taking into account the type of the cellular plastic, the types of the cross-linking agent and the vinyl monomer or their mixture used, the amount thereof to be added in proportion to the cellular plastics, the temperature, the pressure, the conditions of irradiation, such as, the type of radiation, the degree of heat resistance desired and so forth.

The improvement of the heat resistance of cellular plastics in accordance with the method of this invention can be fully achieved by conducting irradiation by ionizing radiation at room temperature or lower temperatures and at the atmospheric pressure or lower pressures. Nevertheless, since this reaction for providing heat resistance is accelerated with an increase of temperature and/or pressure, it is considered desirable to carry out the irradiation by ionizing radiation at temperatures and/or pressures increased to such an extent that the properties of the cellular plastics thus treated are not thereby impaired. In such instances, the required dosages of the radiation can be reduced to some extent.

Further, in the procedure of this invention, one may additionally use any known methods of rendering cellular plastics heat-resistant. It will thus be possible to improve the heat resistance of the cellular plastics to a greater extent.

The present invention can be performed by means of a simple process wherein cellular plastics are subjected to irradiation by ionizing radiation in the presence of a chain cross-linking agent, a vinyl monomer or a mixture thereof. It enables a remarkable effect to be realized in that it can improve the heat resistance of cellular plastics to such an extent that they can be used for a much wider variety of applications.

The invention is illustrated but not limited by the following examples. In the examples, reference is made only to each instance in which a cross-linking agent or a vinyl monomer, or a mixture thereof, all in gaseous phase, are added. It is evident, however, from the results of the research on which this invention is based that a cross-linking agent, a vinyl monomer, or a mixture thereof, eiither in liquid or solid phase may be used.

EXAMPLE 1

Commercially available cellular polyethylene sheets produced by radiation foaming were irradiated at room temperature with cobalt-60 $\gamma$-rays at $4.8 \times 10^6$ roentgens in the presence of nitrogen, acetylene and of a gaseous mixture of acetylene and tetrafluoroethylene (1 : 1), respectively, each at atmospheric pressure. No change in outward appearance attributable to the irradiation was observed on any of the samples irradiated.

Next, a sample not subjected to the irradiation and the above-mentioned samples irradiated in the respective gas atmospheres were placed inside a heating oven. The temperatures at which the cells began to collapse as the samples were heated in the atmosphere by raising the temperature in increments of 2°C every minute, and the degree of longitudinal shrinkage that occurred to samples cut into pieces 50mm long and 20mm wide when they were put into an oven thermostatically regulated at 100°C and heated for 15 minutes, were measured, and the results are shown in Table 1.

The results given in Table 1 indicate that the heat resistance of the cellular polyethylene sheets irradiated with $\gamma$-rays in the presence of a cross-linking agent (acetylene) and a gaseous mixture of the cross-linking agent (acetylene) and vinyl monomer (tetrafluoroethylene) was remarkably improved.

Table 1

| Classification | Irradiation atmosphere | Temperature at which cells began to collapse °C | Degree of shrinkage[1] % |
| --- | --- | --- | --- |
| Example | Acetylene | 100 | 12 |
|  | Acetylene + tetrafluoroethylene | >100[2] | 0[2] |
| Control | No irradiation | 78 | 56 |
|  | Nitrogen | 85 | 32 |

[1] Degree of longitudinal shrinkage after heating at 100°C for 15 min.
[2] No collapse of cells or shrinkage was observed after heating at 110° for 15 min.

EXAMPLE 2

When commercially available cellular polyethylene sheets prepared by chemical foaming were irradiated, at room temperature, with cobalt-60 γ-rays at $4.8 \times 10^6$ roentgens in the presence of nitrogen and of vinyl chloride at the atmospheric pressure, no change in outward appearance attributable to the irradiation was observed in any of the samples irradiated.

Next, when, after heating in the same manner as in Example 1 an unirradiated sample and the irradiated samples processed as described hereinabove, the temperatures at which the cells began to collapse and the degrees of shrinkage were measured, the results given in Table 2 were obtained.

According to the results shown in Table 2, it can be seen that when the irradiation by γ-rays was conducted in the presence of the vinyl monomer (vinyl chloride), the heat resistance was improved remarkably in comparison with the instance in which γ-ray radiation alone was administered.

Table 2

| Classification | Irradiation atmosphere | Temperature at which cells began to collapse °C | Shrinkage* % Longitudinal | Lateral |
| --- | --- | --- | --- | --- |
| Example | Vinyl chloride | ≥100 | 4 | 10 |
|  | No irradiation | 80 | 25 | 26 |
| Control | Nitrogen | 94 | 10 | 25 |

*Degree of shrinkage after heating at 100°C for 15 min.

EXAMPLE 3

Samples of commercially available cellular ethylene-vinyl acetate copolymer were irradiated, at room temperature, with cobalt-60 γ-rays at $4.8 \times 10^6$ roentgens in the presence of nitrogen, of a gaseous mixture of propadiene and tetrafluoroethylene (1 : 1), and of a gaseous mixture of acetylene and tetrafluoroethylene (1 : 1), at the atmospheric pressure. No change in outward appearance attributable to the irradiation was detected in any of the irradiated samples.

Next, when both an unirradiated sample and the above-mentioned irradiated samples were heated in an air bath at a rate of 3°C per minute in increments of temperature, the results described hereinafter were obtained.

The cells in the unirradiated sample started to collapse at 127°C, and those of the sample irradiated in the nitrogen atmosphere at 140°C. However, when the samples irradiated in the presence of the gaseous mixture of propadiene and tetrafluoroethylene and of the gaseous mixture of acetylene and tetrafluoroethylene were left for 15 minutes at 180°C to which the heating temperature had been raised by degrees, no physical change was to be detected in the cellularplastic samples.

This test result indicates that when the cellular ethylene-vinyl acetate copolymer is irradiated with γ-rays in the presence of a cross-linking agent (propadiene, acetylene) and a vinyl monomer (tetrafluoroethylene), the heat resistance of said cellular product is increased remarkably.

EXAMPLE 4

Samples of commercially available cellular polyvinyl chloride, placed in the presence of nitrogen and of a gaseous mixture of propadiene and tetrafluoroethylene (1 : 1), each at a gauge pressure or 2 kg./cm², were subjected to irradiation by cobalt-60 γ-rays at $5.3 \times 10^6$ roentgens at room temperature. No change in outward appearance attributable to the irradiation was observed.

Next, the temperature at which the cells began to collapse, as measured in the same manner as in Example 1, was 130°C in the case of the unirradiated sample and 141°C in the case of the sample irradiated in the presence of nitrogen, whereas no collapse of cells was observed in the sample irradiated in the presence of the gaseous mixture of propadiene and tetrafluoroethylene when heated until the temperature reached 150°C.

Further, when an unirradiated and the irradiated samples were heated for 10 minutes in an air bath regulated at 170°C, the cells in the surface areas of the unirradiated sample and of the one irradiated in the presence of nitrogen were completely destroyed with some flow of the polyvinyl chloride basic material observed. However, little or no change was observed in the sample irradiated in the presence of the gaseous mixture of propadiene and tetrafluoroethylene.

From these results it can be seen that the heat resistance of cellular polyvinyl chloride is improved when irradiated with γ-rays in the presence of a gaseous mixture of a chain cross-linking agent (propadiene) and vinyl monomer (tetrafluoroethylene).

What is claimed is:

1. A process for rendering cellular polyethylene heat resistant which comprises irradiating the polyethylene with ionizing radiation at a dosage of from $10^2$ to $10^9$ roentgens in the presence of from 10 p.p.m. to 50 percent by weight based on the weight of the polyethylene of acetylene and from 10 p.p.m. to 50 percent by weight based on the weight of the polyethylene of tetrafluoroethylene monomer.

* * * * *